United States Patent [19]

Balakirshnan

[11] Patent Number: 6,005,781
[45] Date of Patent: *Dec. 21, 1999

[54] TWO SWITCH OFF-LINE SWITCHING CONVERTER

[75] Inventor: Balu Balakirshnan, Saratoga, Calif.

[73] Assignee: Power Integrations, Inc., Sunnyvale, Calif.

[*] Notice: This patent is subject to a terminal disclaimer.

[21] Appl. No.: 09/032,657

[22] Filed: Feb. 27, 1998

Related U.S. Application Data

[63] Continuation-in-part of application No. 08/964,191, Nov. 4, 1997.

[51] Int. Cl.$^6$ .............................. H02M 3/335; G05F 1/10
[52] U.S. Cl. ................................. 363/21; 363/41; 363/95; 323/222
[58] Field of Search ................................ 323/222; 363/20, 363/21, 22, 41, 84, 95, 97, 127

[56] References Cited

U.S. PATENT DOCUMENTS

| | | | |
|---|---|---|---|
| 3,491,252 | 1/1970 | Petrohilos | 307/229 |
| 3,555,399 | 1/1971 | Buchanan et al. | 321/43 |
| 3,840,797 | 10/1974 | Aggen et al. | 321/2 |

(List continued on next page.)

FOREIGN PATENT DOCUMENTS

| | | | |
|---|---|---|---|
| WO 83/01157 | 3/1983 | European Pat. Off. | H02M 3/335 |
| 0 651 440 A1 | 5/1995 | European Pat. Off. | H01L 23/433 |
| 0 694 966 A1 | 1/1996 | European Pat. Off. | H01L 23/495 |
| 0 736 957 A1 | 10/1996 | European Pat. Off. | H02M 1/12 |
| 0 740 491 A1 | 10/1996 | European Pat. Off. | H05B 41/00 |
| 0 748 034 A1 | 12/1996 | European Pat. Off. | H02M 3/00 |
| 0 748 035 A1 | 12/1996 | European Pat. Off. | H02M 3/155 |
| 0 751 621 A1 | 1/1997 | European Pat. Off. | H03K 17/16 |

OTHER PUBLICATIONS

H.S. Hoffman, Jr., Self–Generated Bias Supply, IBM Technical Disclosure Bulletin, vol. 20, No. 5, Oct. 1997, pp. 1814–1815.

H.S. Hoffman, Jr. et al, Proportional Drive Supply with Diversion Control, IBM Technical Disclosure Bulletin, vol. 21, No. 12, May 1979, pp. 4904–4905.

A. Halperin, 'Primary Regulated Dual Power Supply', IBM Technical Disclosure Bulletin, vol. 21, No. 10, Mar. 1979, pp. 4299–4300.

"5–W dc–dc converters aim at telecomm applications", Electronic Design vol. 31, No. 15, Jul. 21, 1983, pp. 227.

"Combined Switch–Mode Power Amplifier and Supply", IBM Technical Disclosure Bulletin, vol. 28, No. 3, Aug. 1985, pp. 1193–1195.

(List continued on next page.)

Primary Examiner—Adolf Deneke Berhane
Attorney, Agent, or Firm—Blakely Sokoloff Taylor & Zafman, LLP

[57] ABSTRACT

A power supply comprises a first coupled to receive AC mains power that provides a first power level, a second stage that receives the first power level and that provides a second power level, a third stage that receives the first power level that provides a third power level, and a pulse width modulated switching block comprising a first modulation input, a second modulation input, the first modulation input receives a signal indicative of a voltage, current or power at the second stage output and the second modulation input coupled to receive a signal indicative of a voltage, current or power at the third stage output. The pulse width modulated switching block varying operation of the second stage to vary the second power level according to the signal indicative of the voltage, current or power at the second stage output and the pulse width modulated switching block varying operation of the third stage to vary the third power level according to the signal indicative of a voltage, current or power at the third stage output.

25 Claims, 14 Drawing Sheets

U.S. PATENT DOCUMENTS

| | | | |
|---|---|---|---|
| 3,916,224 | 10/1975 | Daniels et al. | 307/265 |
| 4,072,965 | 2/1978 | Kondo | 354/51 |
| 4,143,282 | 3/1979 | Berard, Jr. et al. | 307/43 |
| 4,228,493 | 10/1980 | de Sartre et al. | 363/56 |
| 4,236,198 | 11/1980 | Ohsawa et al. | 363/49 |
| 4,495,554 | 1/1985 | Simi et al. | 363/21 |
| 4,559,590 | 12/1985 | Davidson | 363/21 |
| 4,622,627 | 11/1986 | Rodriguez et al. | 363/37 |
| 4,695,936 | 9/1987 | Whittle | 363/21 |
| 4,706,176 | 11/1987 | Kettschau | 363/21 |
| 4,706,177 | 11/1987 | Josephson | 363/24 |
| 4,720,641 | 1/1988 | Faini | 307/18 |
| 4,725,769 | 2/1988 | Cini et al. | 323/283 |
| 4,734,839 | 3/1988 | Barthold | 363/16 |
| 4,739,462 | 4/1988 | Farnsworth et al. | 363/21 |
| 4,806,844 | 2/1989 | Claydon et al. | 323/311 |
| 4,809,148 | 2/1989 | Barn | 363/20 |
| 4,811,184 | 3/1989 | Koninsky et al. | 363/17 |
| 4,814,674 | 3/1989 | Hrassky | 318/254 |
| 4,858,094 | 8/1989 | Barlage | 363/21 |
| 4,862,339 | 8/1989 | Inou et al. | 363/21 |
| 4,866,590 | 9/1989 | Odaka et al. | 363/49 |
| 4,870,555 | 9/1989 | White | 363/21 |
| 4,887,199 | 12/1989 | Whittle | 363/49 |
| 4,888,497 | 12/1989 | Dallabora et al. | 307/272.3 |
| 4,890,210 | 12/1989 | Myers | 363/21 |
| 4,928,220 | 5/1990 | White | 363/56 |
| 4,937,728 | 6/1990 | Leonardi | 363/97 |
| 4,943,903 | 7/1990 | Cardwell, Jr. | 363/97 |
| 5,012,401 | 4/1991 | Barladge | 363/97 |
| 5,014,178 | 5/1991 | Balakrishnan | 363/49 |
| 5,034,871 | 7/1991 | Okamoto et al. | 363/15 |
| 5,041,956 | 8/1991 | Marinus | 363/21 |
| 5,072,353 | 12/1991 | Feldkeller | 363/20 |
| 5,086,364 | 2/1992 | Leipold et al. | 361/18 |
| 5,146,394 | 9/1992 | Ishii et al. | 363/16 |
| 5,161,098 | 11/1992 | Balakirshnan | 363/144 |
| 5,177,408 | 1/1993 | Marques | 315/291 |
| 5,200,886 | 4/1993 | Schwartz et al. | 363/49 |
| 5,297,014 | 3/1994 | Saito et al. | 363/21 |
| 5,313,381 | 5/1994 | Balakrishnan | 363/147 |
| 5,394,017 | 2/1995 | Catano et al. | 307/66 |
| 5,452,195 | 9/1995 | Lehr et al. | 363/21 |
| 5,461,303 | 10/1995 | Leman et al. | 323/222 |
| 5,481,178 | 1/1996 | Wilcox et al. | 323/287 |
| 5,508,602 | 4/1996 | Borgato et al. | 323/222 |
| 5,528,131 | 6/1996 | Marty et al. | 323/901 |
| 5,541,828 | 7/1996 | Rozman | 363/21 |
| 5,552,746 | 9/1996 | Danstrom | 327/427 |
| 5,563,534 | 10/1996 | Rossi et al. | 327/77 |
| 5,568,084 | 10/1996 | McClure et al. | 327/538 |
| 5,570,057 | 10/1996 | Palara | 327/365 |
| 5,572,156 | 11/1996 | Diazzi et al. | 327/109 |
| 5,617,016 | 4/1997 | Borghi et al. | 323/284 |
| 5,619,403 | 4/1997 | Ishikawa et al. | 363/21 |
| 5,621,629 | 4/1997 | Hemminger et al. | 363/56 |
| 5,640,317 | 6/1997 | Lei | 363/49 |
| 5,673,185 | 9/1997 | Albach et al. | 363/45 |
| 5,712,772 | 1/1998 | Telefus | 363/21 |
| 5,736,842 | 4/1998 | Jovanovic | 323/222 |
| 5,781,421 | 7/1998 | Steigerwald et al. | 363/21 |

OTHER PUBLICATIONS

R. Bruckner, et al, "Optimizing Converter Design and Performance Utilizing Micro Controller System Feedback Control", Proceedings of Powercon 8, E–2, 1981, pp. 1–10.

B. Pelly et al, OPower MOSFETs take the load off switching supply design, Electronic Design, Feb. 1983, pp. 135–139.

D. Azzis et al, Flyback on Card Power Supply, IBM Technical Disclosure Bulletin, vol. 23, No. 4, Sep. 1980, pp. 1477–1478.

A.J. Bowen et al, Power Supply with Optical Isolator, IBM Technical Disclosure Bulletin vol. 14, No. 11, Apr. 1972, pp. 3320.

"Off–Line Power Supply Control Technique Using a Single Transformer to Feed Back Three Control Signals", IBM Technical Disclosure Bulletin, vol. 32, No. 8A, Jan. 1990, pp. 272–273.

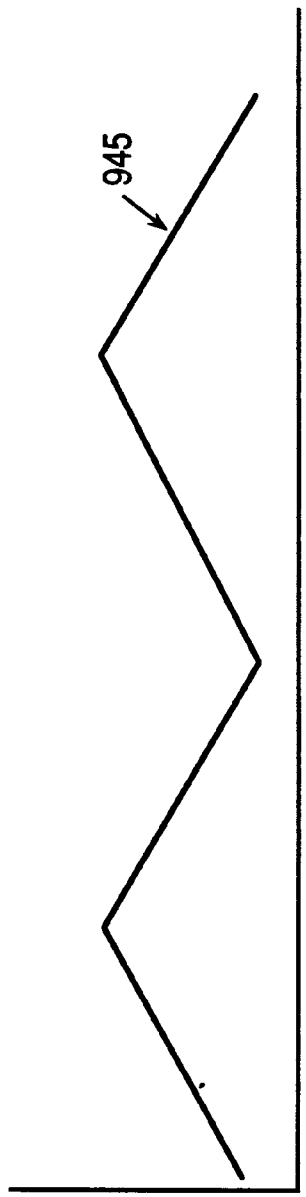

TWO SWITCH OFF-LINE SWITCHING CONVERTER

RELATED APPLICATION DATA

This patent application is a continuation-in-part of U.S. patent application Ser. No. 08/964,191 filed Nov. 4, 1997.

BACKGROUND

1. Field of the Invention

The invention relates to the field of switch mode power supplies, and amongst other things to power supplies that provide multiple output power levels.

2. Background

With the ever-growing demand upon power systems by the use of electronic devices that consume power non-linearly, the amount of apparent power that needs to be delivered is greatly increasing. One of the major problems associated with non-linear power supplies is the harmonic distortion of the current in the power supply grid. That is, non-linear power supplies convert the AC mains signal to a DC signal which results in a non-sinusoidal current being injected into the power grid. The non-sinusoidal character of the current is measured both in terms of power factor of the power supply and the harmonic content of the current waveform.

The production of a non-sinusoidal current can be understood with reference to FIG. 1. In FIG. 1, the AC Mains voltage 5 is input through an Electromagnetic Interference (EMI) filter 10 and a bridge rectifier 15. Bridge rectifier 15 feeds a rectified voltage into capacitor 25 which is used to maintain a substantially DC voltage 17. DC voltage 17 is maintained constant except for a ripple component 27 (FIG. 2A) since there is a certain discharge from capacitor 25 due to the time constant (T) of the capacitor 25, is not sufficiently more than the inverse of the frequency of the AC mains voltage 5 to prevent some voltage discharge. As can be seen in FIG. 2A, the ripple component 35 will at certain times have a magnitude greater than the instantaneous magnitude of AC mains voltage 5. This will cause periods when no current flows through bridge rectifier 15 and the current 22 (FIG. 2B) at the input of bridge rectifier 15 will be discontinuous causing harmonic distortion and a poor power factor. A clamping circuit comprising a zener diode 30 and a diode 35 is used to protect MOSFET 100 from over voltages. Power supply regulation is performed using a flyback topology well known in the art.

The discontinuous current waveforms injected into the power grid can cause the neutral wiring to overload and burn. Further, the harmonic currents cause an under utilization of electrical distribution and generation equipment, thereby increasing the cost of power generation to the utility. Further problems associated with harmonic currents include errors in utility metering equipment, malfunctioning of utility relays, and interference with communication and control signals in nearby lines.

The problems associated with harmonic currents in utility systems have led to the formation of various national and international organizations that are directed toward creating standards to limit harmonic currents for various classes of non-linear power devices. One such organization is the International Electrotechnical Commission, which issued the IEC 1000-3-2 standard that calls for various maximum levels for harmonic currents. These harmonic currents are currents at frequencies that are whole number multiples of the AC mains line frequency.

The harmonic currents created by the circuit described in FIG. 1 is usually far in excess of the requirements of the IEC 1000-3-2 standards. Thereby, power supplies are being designed to improve the harmonic currents. The improvements generally include using added circuitry to decrease the current waveform distortion and to reduce the periods when there is no current flowing through bridge rectifier 15.

Referring to FIG. 3, a modified power supply circuit incorporating a separate power factor correction stage 120 along with a flyback stage 20 is depicted. The power factor correction stage 120 includes a switch mode power supply regulation chip 195, which can be a TOPSWITCH® device manufactured by Power Integrations, Inc. Chip 195 has three terminals, which includes a control terminal 196. The input into control terminal 196 is a current 200 which is a combination of a current 191 which is proportional to the instantaneous rectified voltage and a feedback current 192. Feedback current 192 will be zero until the voltage of capacitor 185 reaches a voltage greater than the reverse break down voltage of zener diodes 150 and 155. In a typical power supply this voltage is typically 400 volts. As the current 200 increases, the duty cycle of the MOSFET in chip 195 decreases.

The MOSFET current 198 is comprised of series of triangular pulses each having a duty cycle. The frequency of triangular pulses, which generally ranges between 25 and 200 kHz, is very high compared to the frequency of a half wave rectified AC Mains voltage 200 which is at 100 Hz (2×50 Hz) or 120 Hz (2×60 Hz). The average MOSFET current 198 that is the average of the triangular pulses is both continuous and a distorted sinusoid when viewed over a single period of the 100 Hz rectified AC mains signal. The diode current 199 is also a series of triangular pulses, the pulses being complimentary to the triangular pulses of the MOSFET current 198. Therefore, average diode current 199 is also both continuous and a distorted sinusoid when viewed over a single period of the 100 Hz half wave AC mains signal.

The average input current waveform 197 at the input of bridge rectifier 15 is kept substantially sinusoidal by allowing current to flow through the MOSFET that has a shape which forms a complete sinusoidal current waveform when added to the average diode current 199 flowing through the boost diode 155 as can be seen in FIG. 4.

Capacitor 25 filters both the high frequency currents due to device 195 and the line frequency ripple to provide a substantially DC output voltage. Capacitor 125 is appropriately sized to prevent the high frequency switching of chip 195 from affecting the input current 197.

The values of capacitor 180, resistors 160, 165, and 170 determine the dominant pole of the power factor correction stage 120. The dominant pole is generally set at approximately 10 Hz. The frequency of the dominant pole is used to maintain the feedback current 192 at a constant level within an AC Mains half cycle of 100 Hz. Maintaining current 200 at a constant level would create a duty cycle which is constant in each AC Mains half cycle which in turn would generate an average MOSFET current 198 flowing through chip 195 that would itself be sinusoidal. As such, the input current 197 would not be sinusoidal since it would be the sum of a sinusoidal average MOSFET current 198 and a non-sinusoidal average diode current 199. To compensate for the fact that a constant feedback current 192 would create an average MOSFET current 198 that is sinusoidal, a feed forward scheme is employed using a feed forward current 191 through resistor 190 that varies the duty cycle linearly with the instantaneous rectified AC line voltage magnitude as can be seen in FIG. 5. This way the average MOSFET current 198 is distorted and the resulting input current 197 is maintained as sinusoidal.

The flyback converter stage 20 is operated like a conventional flyback converter stage with a second device using optocoupler feedback. The flyback converter can also be replaced with a forward converter.

Power Factor Correction stages of the type described with respect to FIG. 3 have been able to achieve power factors in excess of 0.95 and Total Harmonic Distortions less than 9%. However, the addition of a power factor correction stage is costly in terms of components which results in a far larger bill of materials and power supply size, as can be seen by comparing the number of components in FIG. 1 to the number of components in FIG. 3. Further, the additional components decrease the reliability of the power supply.

Another problem associated with conventional power supplies is that the power supplies operate and draw power even when the device that they are supplying is in a "sleep mode". In a computer, a conventional power supply will operate drawing large amounts power even if the computer is utilizing only minimum power in "standby" or "sleep" mode. By drawing a large amount of power when the system is not operating, power costs to the end user increases without deriving any appreciable benefits. When in sleep mode different components of a computer utilize a different amount of power. For instance the monitor and keyboard need very little power to continue operation, while the random access memory may need more power than the keyboard or monitor.

It is therefore desired to create a power supply that can supply power to a computer that can supply power for the differing needs of the different systems of the computer.

It is additionally desired to create a power supply that has standby functionality to decrease power consumption and associated costs for end users.

SUMMARY OF THE INVENTION

In one embodiment the present invention is directed toward a power supply comprising a first stage that receives AC mains power and provides a first power level, a second stage that receives the first power level and provides a second power level; a third stage that receives the first power level and provides a third power level. The power supply also comprises a pulse width modulated switching block comprising a first modulation input coupled to receive a signal indicative of a voltage, current or power at the output of the second stage and a second modulation input coupled to receive a signal indicative of the a voltage, current or power at the output of the third stage. The pulse width modulated switching block varying operation of the second stage to vary said second power level and varying operation of the third stage to vary the third power level.

In another embodiment the present invention is directed toward a power supply comprising a rectifier coupled to receive AC mains power, a power supply capacitor coupled to the rectifier that provides a first power level, a first primary winding coupled to receive the first power level, a second primary winding coupled to receive the first power level, a first secondary winding magnetically coupled to the first primary winding that provides a second power level, and a second secondary winding magnetically coupled to the second primary that provides a third power level. The power supply also comprising a pulse width modulated switching block coupled to receive a signal indicative of the second power level and a signal indicative of the third power level. The pulse width modulation controller coupled to the first primary winding and the second primary winding.

It is an object of an aspect of the present invention to create a power supply that can supply power to a computer that can supply power for the differing needs of the different systems of the computer.

It is another object of an aspect of the present invention to create power supply that has standby functionality to decrease power consumption and associated costs for end users.

The above and other preferred features of the inventions, including various novel details of implementation and combination of elements will now be more particularly described with reference to the accompanying drawings and pointed out in the claims. It will be understood that the particular methods and structures embodying the invention are shown for illustration only and not as limitations of the present inventions. As will be understood by those skilled in the art the principles and features of the inventions may be employed without departing from the scope of the invention.

BRIEF DESCRIPTION OF THE DRAWINGS

FIG. 11A is a diagram of a triangular waveform input into the comparators of FIG. 11 according to a preferred embodiment of the present invention.

FIG. 11B is a diagram of a clock signal of FIG. 11 according to a preferred embodiment of the present invention.

DETAILED DESCRIPTION OF THE PREFERRED EMBODIMENT

Figure 6:
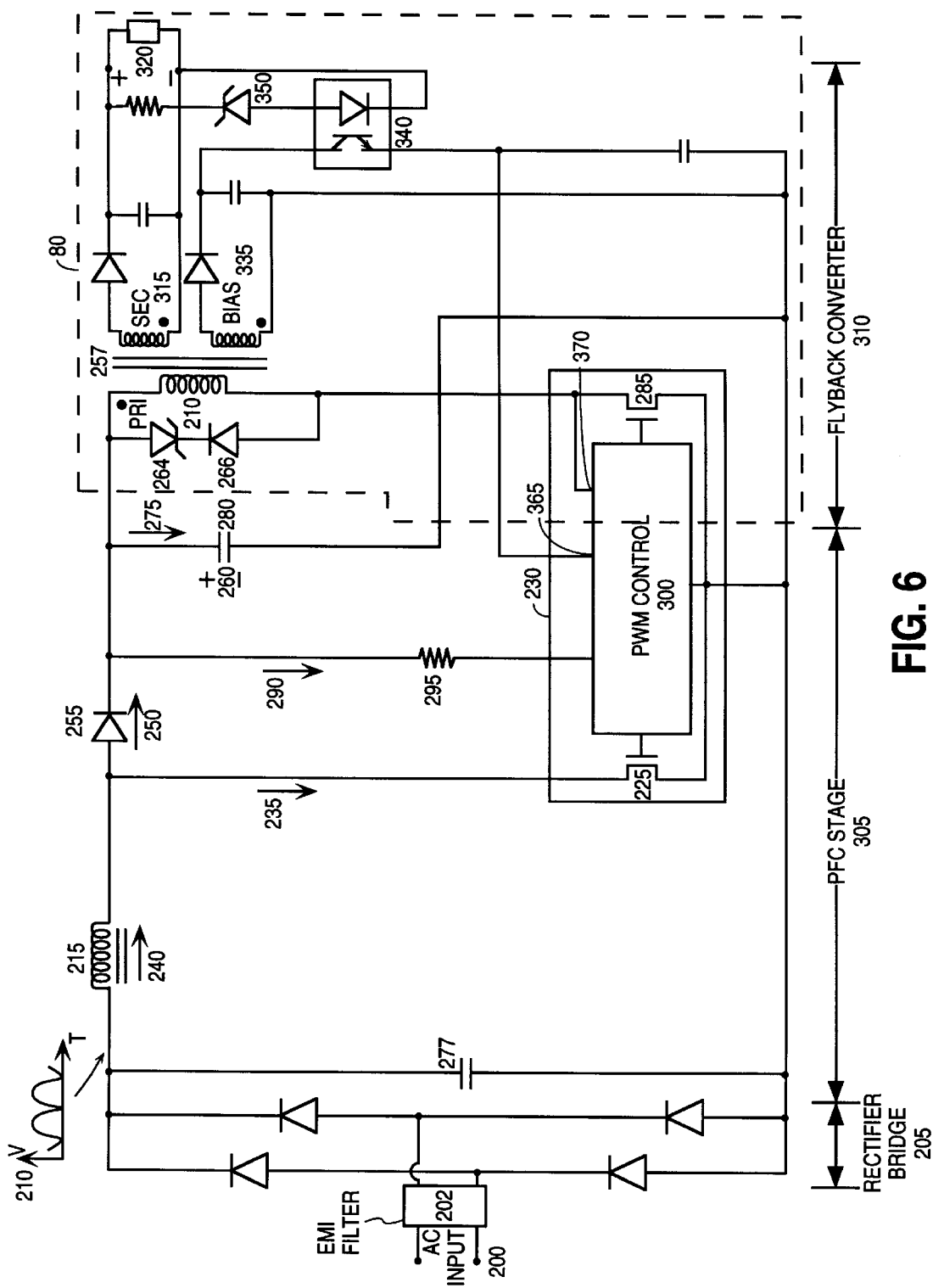
FIG. 6 is a power supply according to a preferred embodiment of the present invention.

Referring to FIG. 6, an AC Mains signal 200 is input through an EMI filter 202 to a bridge rectifier 205 which outputs a rectified signal 210. At a terminal of a boost inductor 215, there is a connection to the negative terminal of the output of the bridge rectifier through a first MOSFET 225 that acts as a switch. First MOSFET 225 is preferably part of a pulse width modulated switching block 230. Pulse width modulated switching block 230 contains circuitry for performing both power factor correction and power supply regulation functions and is preferably a single monolithic integrated circuit. Alternatively, two separate pulse width modulated switching blocks each comprising a MOSFET and a pulse width modulation controller can be used in place of a single pulse width modulated switching block. The two separate pulse width modulated switching blocks may be monolithic integrated circuits or may be comprised of discrete components.

Figure 7A:
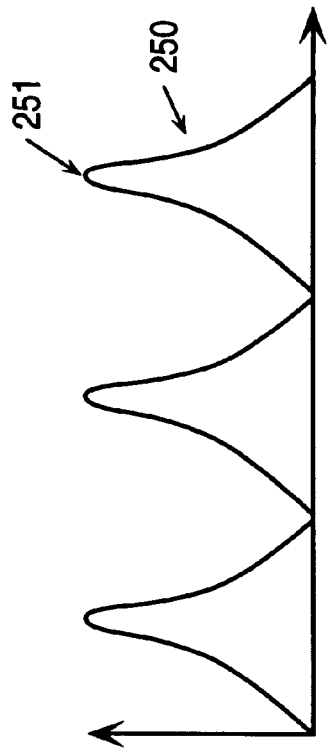
FIG. 7A is a diagram of the average current through the boost diode of FIG. 7 according to a preferred embodiment of the present invention.

To maintain a sinusoidal current waveform at the input of bridge rectifier 205, the average first MOSFET current 235 flowing through first MOSFET 225, is varied over a AC Mains half cycle in order to maintain an average boost inductor current 240 that is substantially sinusoidal. To maintain an average boost inductor current 240 as being substantially sinusoidal, the average first MOSFET current 235 should be maintained as a difference between a sinusoidal waveform and the average boost diode current 250 which flows through boost diode 255. In the embodiment of FIG. 6, the average value of boost diode current 250, which is a distorted sinusoid, is shown in FIG. 7A.

Figure 7B:
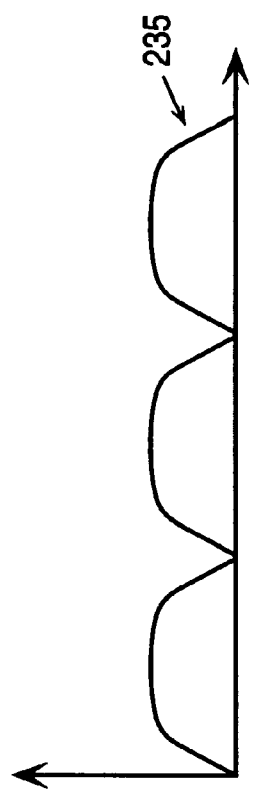
FIG. 7B is a diagram of the average current though the first MOSFET 235 of FIG. 7 according to a preferred embodiment of the present invention.
Figure 7C:
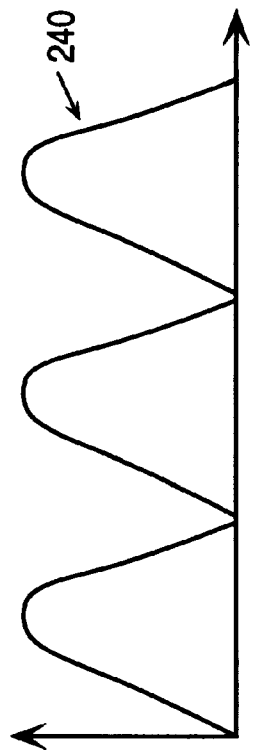
FIG. 7C is a diagram of the average current though the boost inductor of FIG. 7 according to a preferred embodiment of the present invention.

Power factor correction is performed by compensating the distortion in the average diode current 255 by the average first MOSFET current 235 as can be seen in FIG. 7B. At the peak level 251 of the average boost diode current 250 (FIG. 7A), the duty cycle of first MOSFET 225 is reduced to decrease the average value of first MOSFET current 235. By reducing the duty cycle of the first MOSFET 225 at the peak of the average boost diode current 250, the average boost inductor current 250 (which is the sum of the average boost diode current 250 and the average first MOSFET current 235) is maintained as a substantially sinusoidal waveform on a cycle by cycle basis (FIG. 7C).

The average first MOSFET current 235 is shaped by varying the duty cycle of first MOSFET 225 inversely with the capacitor voltage 260 of capacitor 285. This is because the capacitor voltage 260 varies with the average boost diode current 250. The capacitor voltage 260 generates a resistor current 290 that varies with the average boost diode current 250. The resistor current 290 is input into pulse width modulation controller 300, and the duty cycle of the first MOSFET 225 is varied according to the magnitude of the resistor current 290. For instance, as the resistor current 290 increases, the duty cycle of first MOSFET 225 will decrease. In turn, this causes the average first MOSFET current 235 to decrease. Since the average boost diode current 250 is increasing at the same time that the first MOSFET current 235 is decreasing, the overall waveform shape of the average boost inductor current 240 will be closer to sinusoidal. In this way, the average first MOSFET current 235 when combined with the average current boost diode 250 creates a substantially sinusoidal boost inductor current 240 which is output by the power supply.

As previously stated, the duty cycle of first MOSFET 225 is inversely proportional to the resistor current 290. The magnitude of the resistor current 290 is inversely proportional to the resistance of resistor 295. The duty cycle of the first MOSFET 225 is then a function of the value of the resistor 295. For instance, a larger value of resistor 295 will increase the duty cycle of first MOSFET 225 due to the lower magnitude of the resistor current 290. In power supply applications, the value of resistor 295 should be selected depending on the required average DC capacitor voltage 260. The magnitude of the capacitor voltage 260 is greater than the peak value of the rectified voltage 210. Typically, the capacitor voltage 260 is approximately equal to 400 Volts for a 230 Volts AC Mains voltage and is approximately equal to 200 Volts for a 115 Volts AC Mains voltage.

Figure 8:
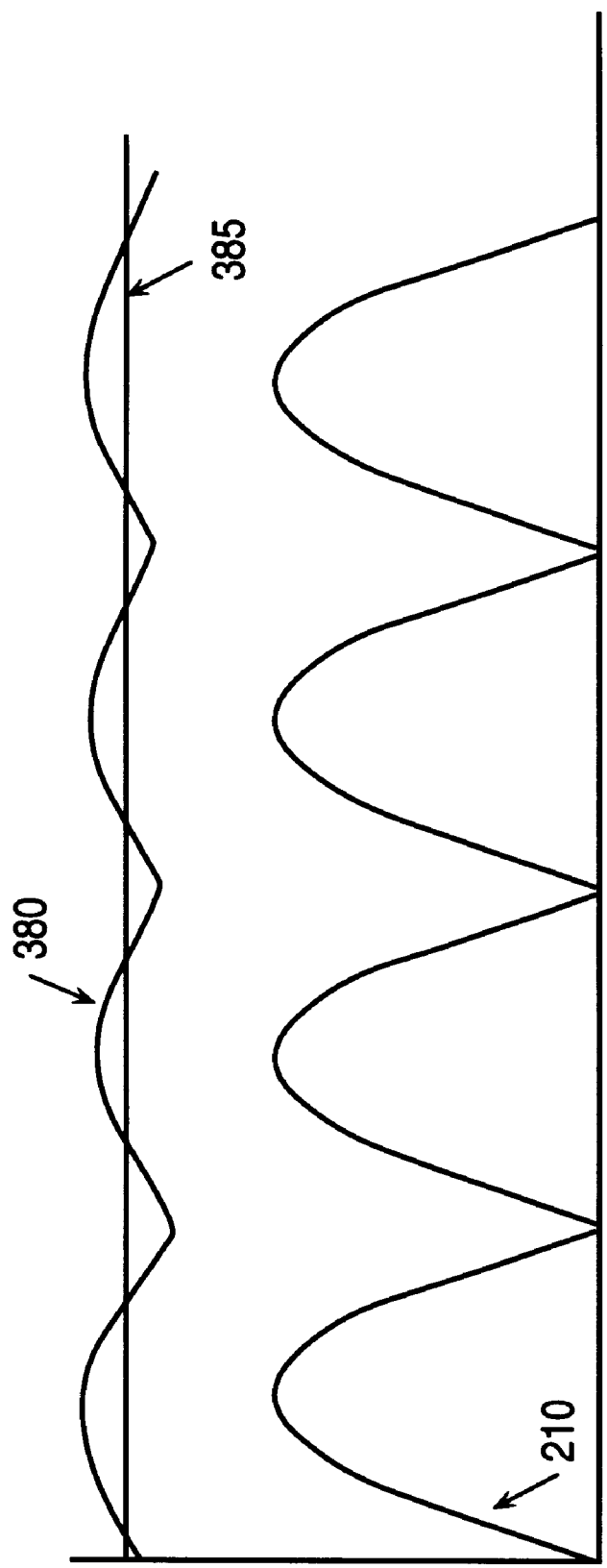
FIG. 8 is diagram of the capacitor voltage of FIG. 6 including a ripple component according to a preferred embodiment of the present invention.

A ripple component 380 (FIG. 8) of capacitor voltage 260, which is superimposed upon DC component 385 (FIG. 8), has a shape similar to the instantaneous magnitude of the rectified voltage 210. That is, when the instantaneous magnitude of the rectified voltage 210 reaches its peak value the ripple component of capacitor voltage 260 also reaches its peak value thereby reducing the duty cycle of MOSFET 225 which reduces the average first MOSFET current 235 (FIG. 7B). In this way, the introduction of a ripple component 380 to the capacitor voltage 260 reduces the duty cycle of first MOSFET 225 as the average diode current 240 is peaking and this will partially compensate for the distortion present in the average diode current 250 so that the average boost inductor current will more accurately follow the instantaneous value of the rectified voltage 210, thereby improving the power factor. The variance in ripple component 380 is a function of the capacitance of capacitor 280, which allows the level of power factor correction to be a design parameter that can be changed by adjusting the value of capacitor 280.

In the power supply of FIG. 6, the frequency of the dominant pole of the power factor correction stage 305 is based upon the component values of capacitor 280 and the load. The capacitor 280 functions as both the output filter capacitor for the power factor correction stage 305 and the loop compensation capacitor for the power factor correction stage 305, thereby eliminating the need for the additional capacitor 180 which was required in FIG. 3. Further, the dominant pole of the circuit of FIG. 6 reduces any overshoot of voltage 260 at start-up. Additionally, the dominant pole of the circuit of FIG. 6 reduces the susceptibility of voltage 260 to transient variations due to changes in the load. This is because any change in the voltage 260 which is the voltage at the node of the dominant pole will be quickly corrected by the power factor correction stage 305 as the rest of the loop will be much faster than the node of the dominant pole.

A high frequency capacitor 277 having an appropriate capacitance value is used at the output of bridge rectifier 205 to by pass the high frequency switching components of the first MOSFET current 235, from passing through the bridge rectifier 205 to the AC mains.

A clamping circuit comprising a zener diode 264 and a diode 266 is used to prevent voltage spikes caused by the leakage inductance of transformer 257 from damaging the MOSFET 285, as in prior art power supplies.

Pulse width modulated switching block 230 also regulates the output voltage supplied by the flyback converter stage 310 to a load 320 located at a secondary winding 315 by use of a second MOSFET 285. The duty cycle of MOSFET 285 is varied by an optocoupler current 375, which is indicative of the voltage supplied to the load, output from an optocoupler 340 that is received at second control terminal 365. The optocoupler current will be substantially zero until the voltage at the output terminals 320 rises above the reverse breakdown voltage of zener diode 350. As long as the voltage at load 340 is greater than the reverse breakdown voltage of the zener diode 350, a current will flow into second control terminal 365 reducing the duty cycle of second MOSFET 285 which reduces the power stored by transformer 257 which in turn reduces the voltage supplied to load 320 and keeps it in regulation.

A bias winding 335 is used to provide bias voltage to optocoupler 340 so that it can supply an optocoupler current 375 to second control terminal 365 that varies according to deviation of the voltage of load 320 from the regulated value.

Optocoupler feedback is one of many possible methods of feedback regarding the voltage, current or power delivered to the load that can be used by the present invention. Other feedback methods can be used by the present invention without deviating from the scope and teachings of the present invention so long as the feedback topology used provides a signal proportional to the load voltage, current or power.

Additionally, other types of topologies for power supply stage 310 such as buck or buck-boost topologies can be used with the present invention without departing from the scope of the present invention.

Figure 1:
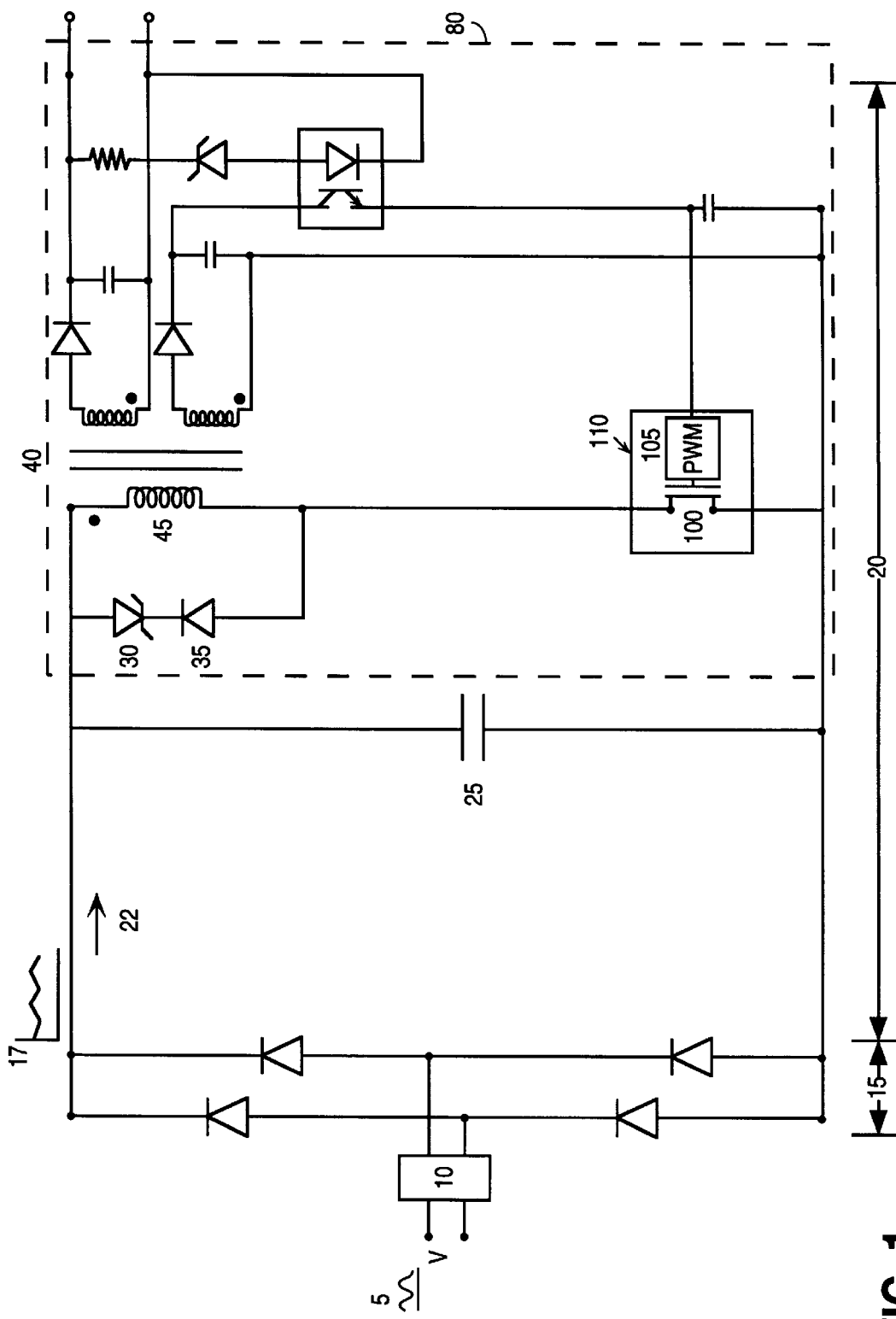
FIG. 1 is a prior art flyback power supply with switch-mode regulation.
Figure 2A:
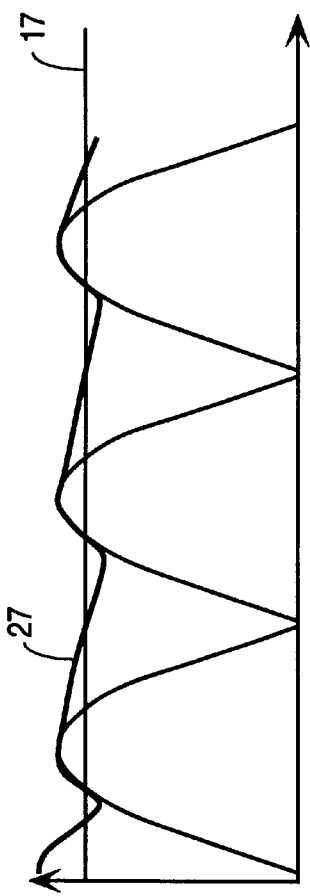
FIG. 2A is a diagram of a rectified AC Mains voltage generated by the prior art flyback power supply of FIG. 1.
Figure 2B:
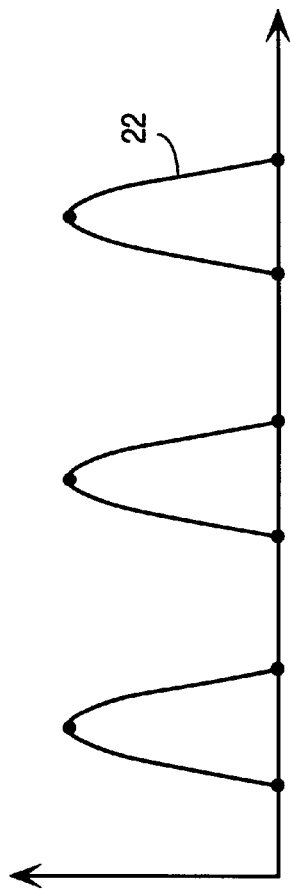
FIG. 2B is a diagram of a current drawn from the AC Mains generated by the prior art flyback power supply of FIG. 1
Figure 3:
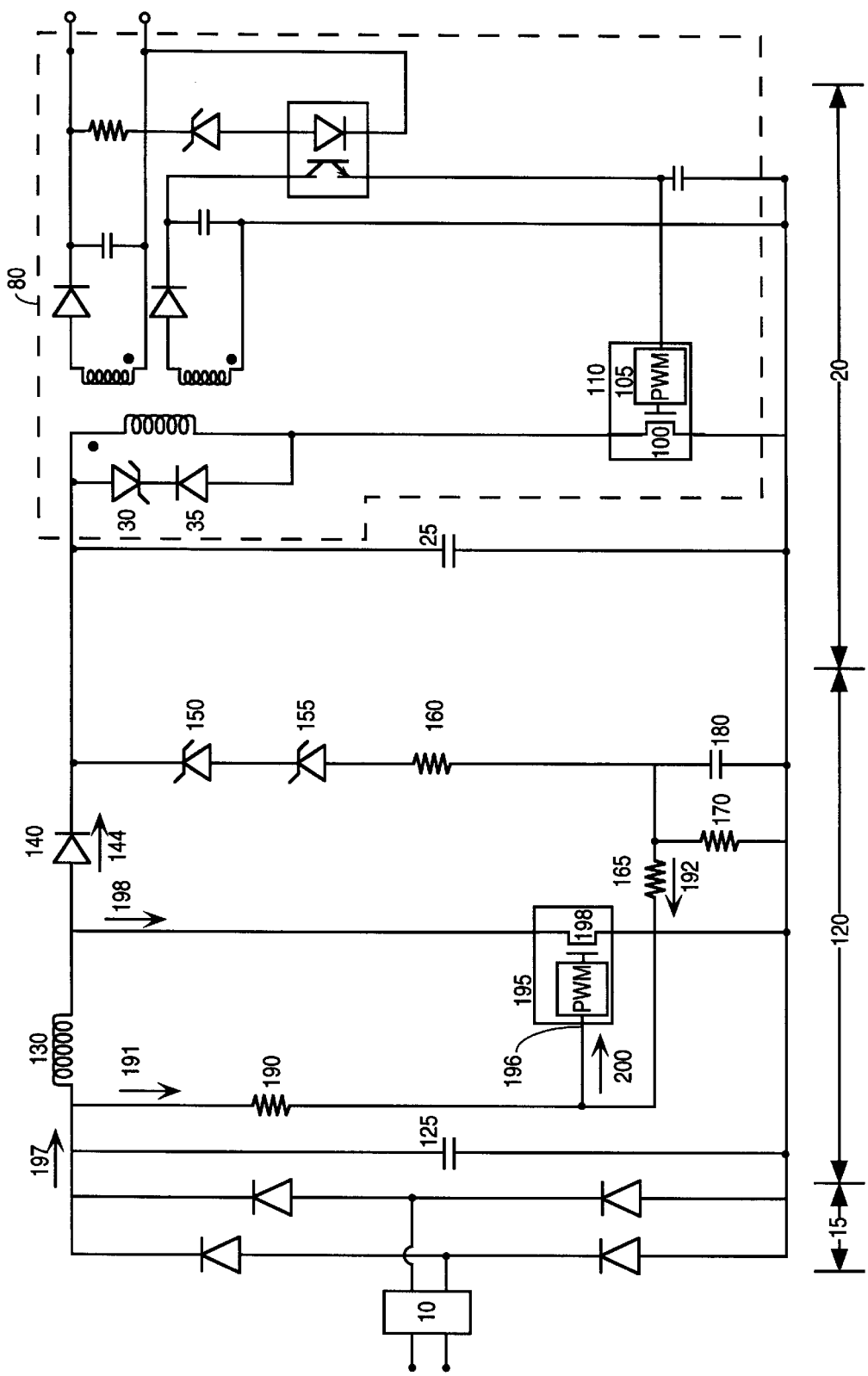
FIG. 3 is an embodiment of a prior art power supply circuit incorporating a separate power factor correction stage and a power supply regulation stage.
Figure 4:
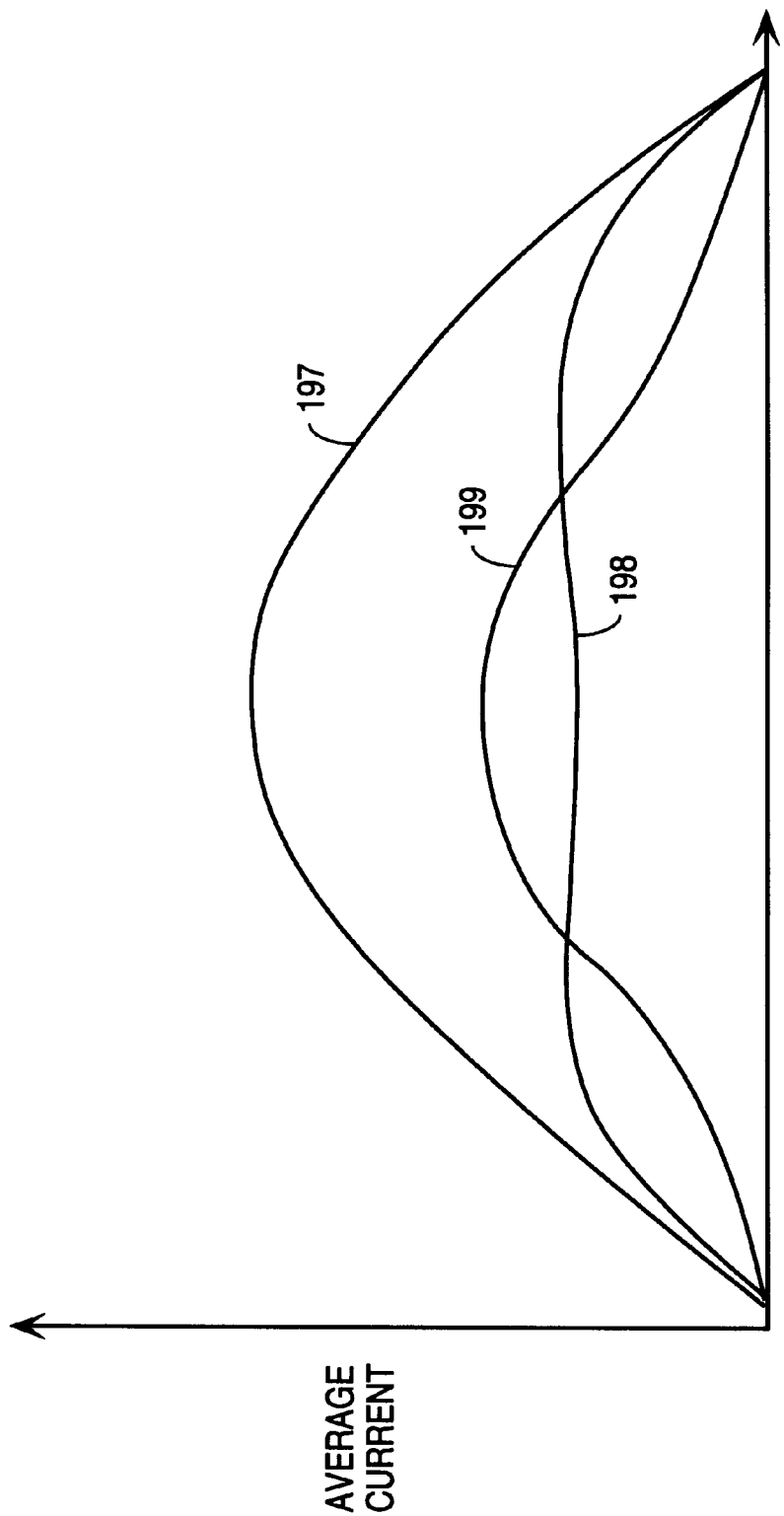
FIG. 4 depicts the average current waveforms that are generated in the prior art power factor correction stage of FIG. 3.
Figure 5:
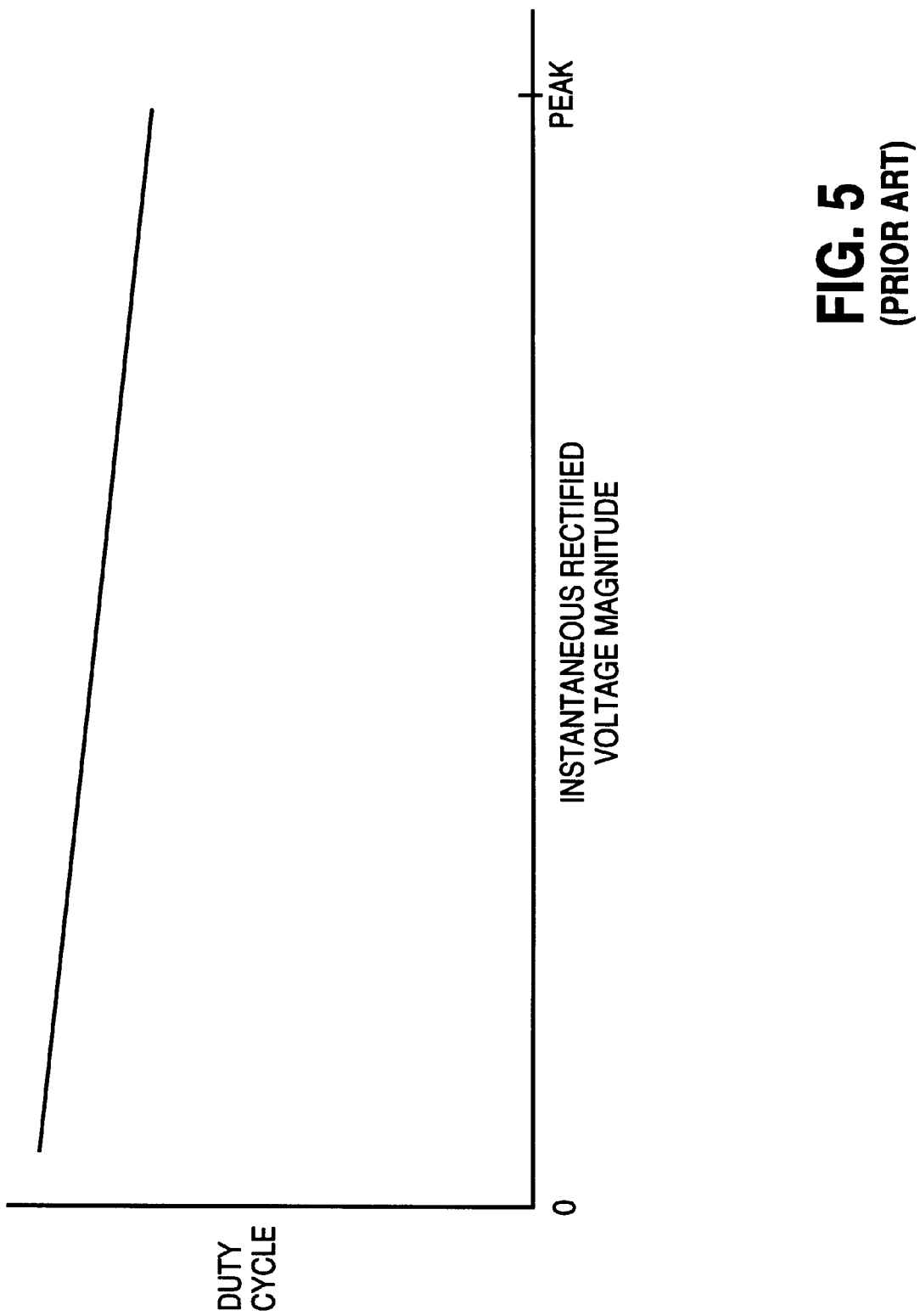
FIG. 5 depicts the relationship of the switch duty cycle to the instantaneous AC Mains voltage in the prior art power factor correction stage of FIG. 3.

As can be seen by comparing the power supply of FIG. 3 to the power supply of FIG. 6, the number of components used in a power supply according to a preferred embodiment of the present invention is less than the number of components needed in prior art combined power factor correction and power supply regulation systems. The need for fewer components greatly decrease the bill of material costs for power supply manufacturers and reduces the costs of the power supply. Further, the use of fewer components increases the reliability of the power supply as well as reducing its size.

Referring again to FIG. 6, pulse width modulation controller 300 includes a connection terminal 370 that is coupled to the primary winding 390. A current flowing into connection terminal 370 when the MOSFET 285 is non-conducting can be used to provide power to pulse width modulation controller 300 during start up. An embodiment of one type of apparatus and method for designing a configuration for providing power to pulse width modulation through connection terminal 370 is disclosed in commonly owned U.S. Pat. No. 5,014,178 which is incorporated herein by reference in its entirety.

Figure 9:
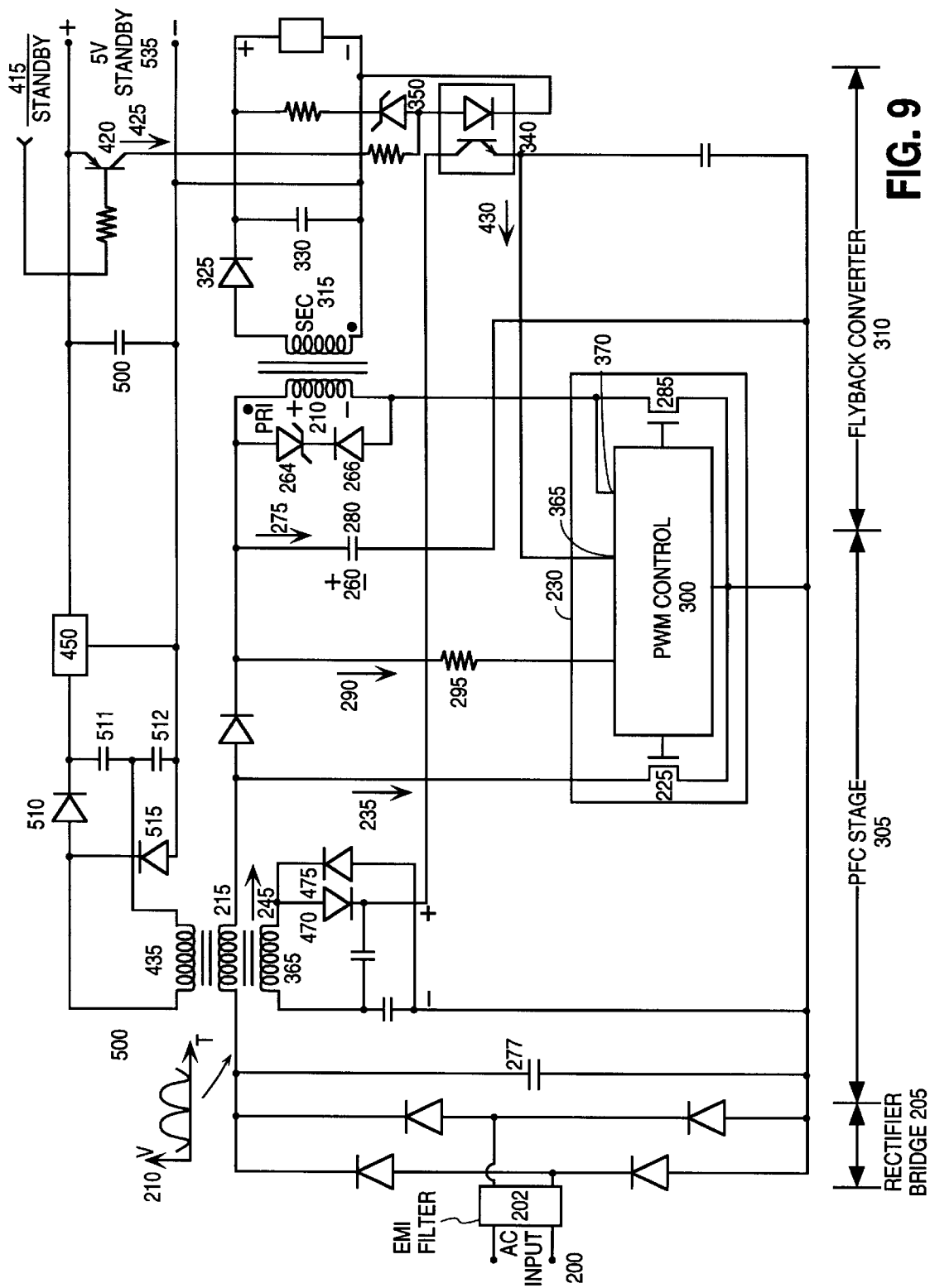
FIG. 9 is an alternate embodiment of a power supply with standby functionality according to the present inventions.

FIG. 9 is an embodiment of the invention that includes a low power standby circuit 400. Power Factor Correction Stage 305 operates in the same manner as described with respect to FIG. 6 and FIGS. 7A–7C. Flyback converter stage 310 also regulates the output voltage in the same manner as described with respect to FIG. 6 when the device to which power is being supplied is in a non-standby mode.

When the load is turned off, a standby signal 415 is fed into the base of transistor 420, which in turn drives a large current 425 into the optocoupler 340, which induces an optocoupler current 450 which is sufficient to reduce the duty cycle of MOSFET 285 to zero. With second MOSFET 285 off, no current flows in the primary winding of transformer 257 and therefore no power is delivered through secondary winding 315 to the load. This condition will continue as long as the standby signal 415 is being fed to the base of transistor 420. Once the standby signal 415 is removed, normal power supply regulation using optocoupler feedback is resumed. During the time when the standby signal 415 is being fed into the base of transistor 420, power is being supplied to the load through standby terminals 535. The power supplied through standby terminals 535 is generally less than the power supplied through secondary winding 315 during normal operation. In a preferred embodiment, the stand by voltage level is preferably five (5) volts. The standby voltage is supplied through standby inductor 435 that is coupled to boost inductor 215. Since inductor 215 is always conducting an AC current, power can be supplied through standby circuit 400, even when the primary winding is not conducting.

The standby stage 500 includes diodes 510 and 515, and capacitors 511 and 512 that are arranged with respect to standby inductor 435 so that the voltage at the input of linear regulator 525 is proportional to regulated voltage 260. This voltage is further regulated to a slightly lower voltage by linear regulator 525, such that a substantially DC voltage with a desired magnitude, preferably five volts, is maintained at the standby terminals 535. Further, a standby capacitor 520 is added in order to better maintain a DC waveform at standby terminals 535.

In the embodiment of FIG. 9, bias winding 365 is magnetically coupled to boost inductor 215 as opposed to primary winding 390. This is done so that voltage may be supplied to optocoupler 340, thereby allowing operation even when no power is delivered by transformer 257 in standby mode. In the embodiment of FIG. 9, the voltage induced at bias winding 365 is rectified using diodes 470 and 475.

It should be noted that the power factor correction stage 305 is operating whether power is being supplied to the load through transformer 257 or through standby circuit 400. In this way the power factor and low current harmonic distortion are maintained by the power supply regardless of the mode of operation. Further when the flyback stage 310 is not operating in the embodiments of FIG. 9 the first MOSFET 225 can be operated at a lower frequency than when flyback stage 310 is operating, which increases the efficiency of the power supply in the low power standby state.

Figure 10:
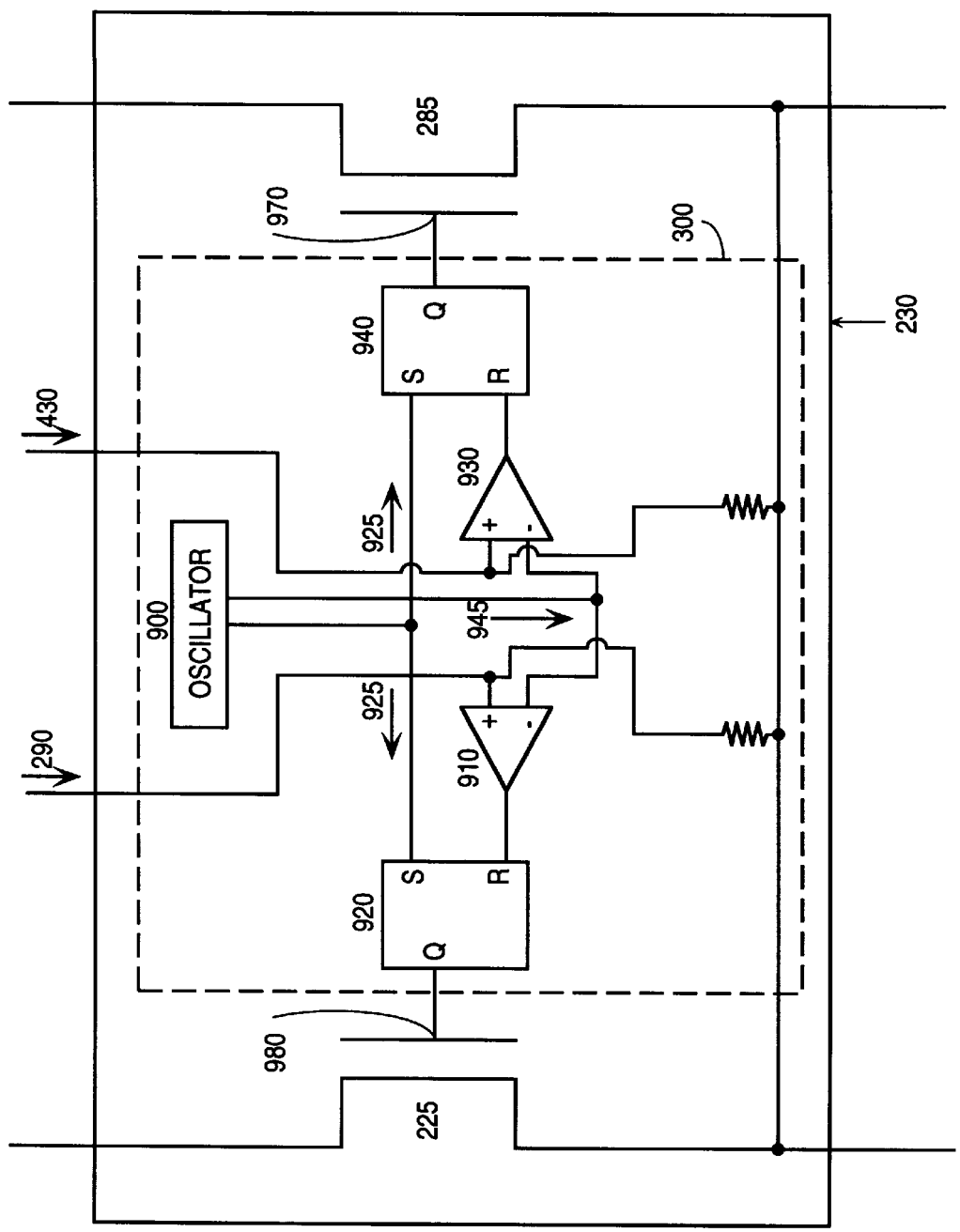
FIG. 10 is an integrated device that performs power factor correction and power supply regulation according to a preferred embodiment of the present invention.

Referring to FIG. 10, a preferred embodiment of function block 230 is depicted. First MOSFET 225 and second MOSFET 285 are controlled by a single pulse width modulation controller 300. Pulse Width Modulation circuit 300 includes a single oscillator 900 that feeds the same saw toothed waveform into comparator 910 and comparator 930. Further, oscillator 900 feeds an identical clock signal 925 into latches 920 and 940.

Comparator 910 receives a voltage that is proportional to the resistor current 290 and is compared to the saw toothed waveform 940 (FIG. 11A). At the beginning of a clock cycle, in response to clock signal 925, a signal is sent to first MOSFET gate 960 latching on first MOSFET 225 (FIG. 11B). As long as the voltage that is proportional to the resistor current 290 is less than the instantaneous magnitude of the saw toothed waveform 940, first MOSFET 225 is on, and first MOSFET current 235 is flowing (FIG. 7). If the voltage that is proportional to the resistor current 290 is greater than the instantaneous magnitude of the saw toothed waveform 940, MOSFET 225 is turned off.

With respect to comparator 930, the saw toothed waveform 940 is compared to a voltage proportional to optocoupler current 430 (FIG. 11A). At the beginning of a clock cycle, a signal is sent to the second MOSFET gate 970 latching on MOSFET 285 (FIG. 11B). As long as the voltage proportional to optocoupler current 430 is less than the instantaneous magnitude of the saw toothed waveform 940, first MOSFET 225 is on, and first MOSFET current 235 is flowing. If the voltage proportional to optocoupler current 430 is greater than the instantaneous magnitude of the saw toothed waveform 940, MOSFET 225 is turned off.

Figure 12:
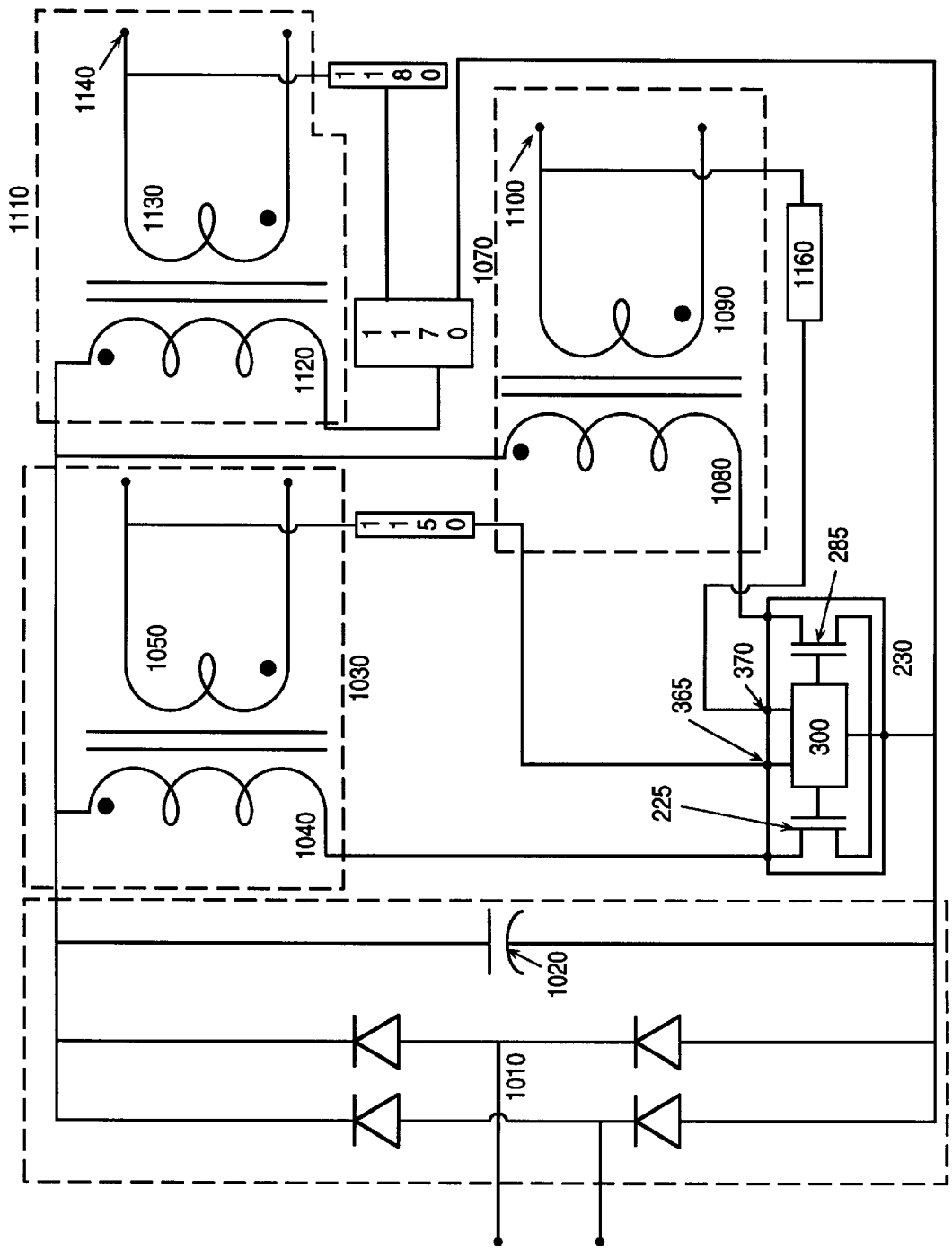
FIG. 12 is a block diagram of a presently preferred power supply that supplies multiple power levels according to the present invention.

Referring to FIG. 12, a power supply comprises a first stage 1000. The first stage includes a rectifier 1010 coupled to the AC mains line. The output of the rectifier 1010 is provided to a power supply capacitor 1020 that provides a substantially DC signal to a second stage 1030. The second stage 1030 includes a second stage primary winding 1040 and a second stage secondary winding 1050 that are used to supply power at a first level to second stage output terminals 1060.

The substantially DC signal is provided by supply capacitor 1020 is also utilized by third stage 1070. Third stage 1070 includes a second stage primary winding 1080 that receives the substantially DC signal and a third stage secondary winding 1090 that supplies power at a second level to third stage output terminals 1100.

Pulse width modulated switching block 230 has a first control terminal 365 and second control terminal 370. The first control terminal 365 receives a signal from first feedback circuit 1150 that is indicative of the power, voltage or current at second stage output terminals 1060. In response to the signal indicative of the power, voltage or current at second stage output terminals 1060 the duty cycle of first MOSFET 225 is modified by pulse width modulation controller 300, e.g. as the power, voltage or current increases the duty cycle of the first MOSFET 225 decreases and as the power, voltage or current decreases the duty cycle of first MOSFET 225 increases. In this way the power, voltage or current supplied at the second stage output terminals 1060 is maintained within a regulated range. The actual regulated range is dependent on the application or device to which the second stage output terminals 1060 supply power.

The second control terminal 370 receives a signal from second feedback circuit 1160 that is indicative of the power, voltage or current at third stage output terminals 1100. In response to the signal indicative of the power, voltage or current at third stage output terminals 1100 the duty cycle of second MOSFET 285 is modified by pulse width modulation controller, e.g. as the power, voltage or current increases the duty cycle of the second MOSFET 285 decreases and as the power, voltage or current decreases the duty cycle of second MOSFET 285 increases. In this way the power, voltage or current supplied at the third stage output terminals 1100 is maintained within a regulated range. The actual regulated range is dependent on the application or device to which the third stage output terminals 1100 supply power to.

It should be noted that although both second stage 1030 and third stage 1110 utilize windings to transfer power input from the first stage 1000 the description is not to be construed as limiting in any way. Any energy storage or transforming element can be substituted in place of the windings without departing from the spirit and scope of the present invention.

It is also presently preferred that level of the power supplied at the second stage output terminals 1060 and the power supplied at the third stage output terminals 1100 is different. In this way, two different power levels can be supplied to different components, subsystems or parts of single device. Pulse width modulated switching block 230 can then regulate the output of a number of different devices simultaneously. It is presently preferred that pulse width modulated switching block 230 is a monolithic device, thereby allowing operation of two devices with a single pulse width modulation controller 300.

Referring again to FIG. 12, a fourth stage 1110 includes a fourth stage primary winding 1120 and a fourth stage secondary winding 1130 that are used to supply power at a third level to fourth stage output terminals 1140. It is presently preferred that fourth stage 1110 function as a standby power supply and that power at the third level is less than the power supplied by both the second stage 1030 and the third stage 1070. It is also presently preferred that fourth stage 1110 is not regulated with a pulse width modulated switching block 230 but utilizes a regulation circuit 1170 and a feedback circuit 1180. The preferred operation regulation circuit 1170 and feedback circuit 1180 is disclosed and described in copending U.S. Patent Application Serial No. [Not Yet Assigned], Lyon & Lyon Docket No. 232/113 filed contemporaneously with this patent application, which is incorporated herein by reference in its entirety.

The presently preferred feedback circuits 1150 and 1160 utilize a zener diode in series with an optocoupler as is known in the art. The presently preferred feedback circuit 1180 comprises a TL431 active zener manufactured by Texas Instruments Corporation in combination with an optocoupler.

Figure 13:
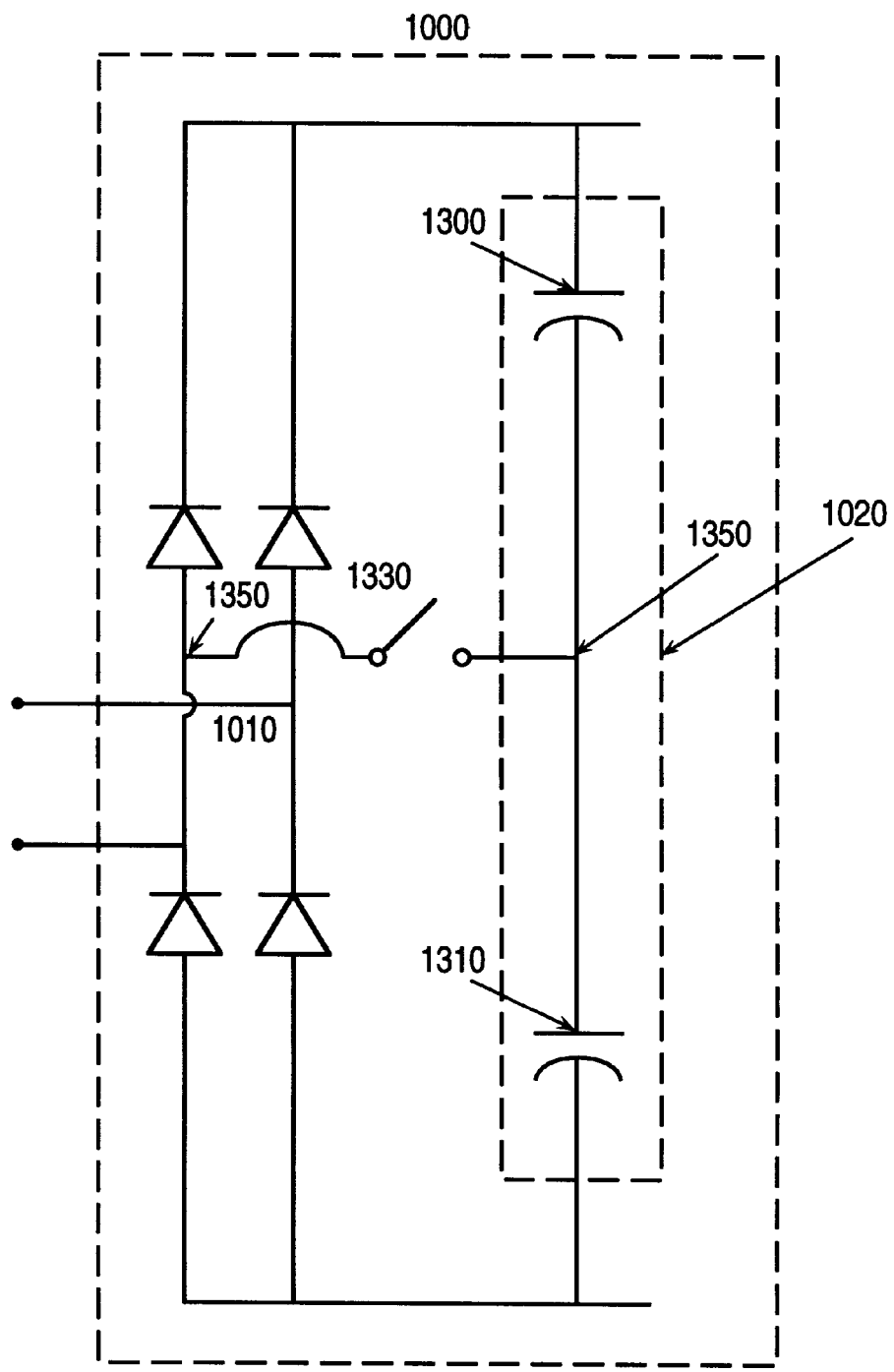
FIG. 13 is a presently preferred first stage of a presently preferred power supply that supplies multiple power levels according to the present invention.

Referring to FIG. 13, a presently preferred first stage 1000 receives AC mains input that is provided to rectifier 1010 that provides a rectified signal. The rectified signal is provided to power supply capacitor 1020 that comprises a voltage doubler circuit comprised of a first capacitor 1310 and a second capacitor 1320 connected in series at a tie point 1330. It is presently preferred that a switch 1340 is used to couple tie point 1330 to mid-point 1350 of rectifier 1010 to switch between a doubler mode and a nondoubler mode in order to allow for operation worldwide by being capable of utilizing worldwide mains voltages that range between 85 and 265 volts.

The embodiment of FIG. 12 is especially useful for supplying power to computer. It is presently preferred that when operating a computer the power supply operates in three modes. The three modes are a normal operation mode, a suspend mode and a deep sleep mode. In normal operation second stage 1030, third stage 1070, and fourth stage 1110 each supply power to the computer. In a suspend mode, it is presently preferred that fourth stage 1110 be utilized to supply power to a keyboard and that third stage 1070 be utilized to supply power to the random access memory and modem of the computer, and second stage 1030 is not operating. In a deep sleep mode only fourth stage 1170 is supplying power to the keyboard of a computer. It is further presently preferred that the magnitude of the output power, current or voltage of the third stage 1070 is greater than the magnitude of the output power, voltage, or current of the fourth stage 1110. This is because a random access memory and modem require more power than do the keyboard and monitor. Additionally, the overall power consumption of the presently preferred power supply is less than known power supplies.

Figure 14:
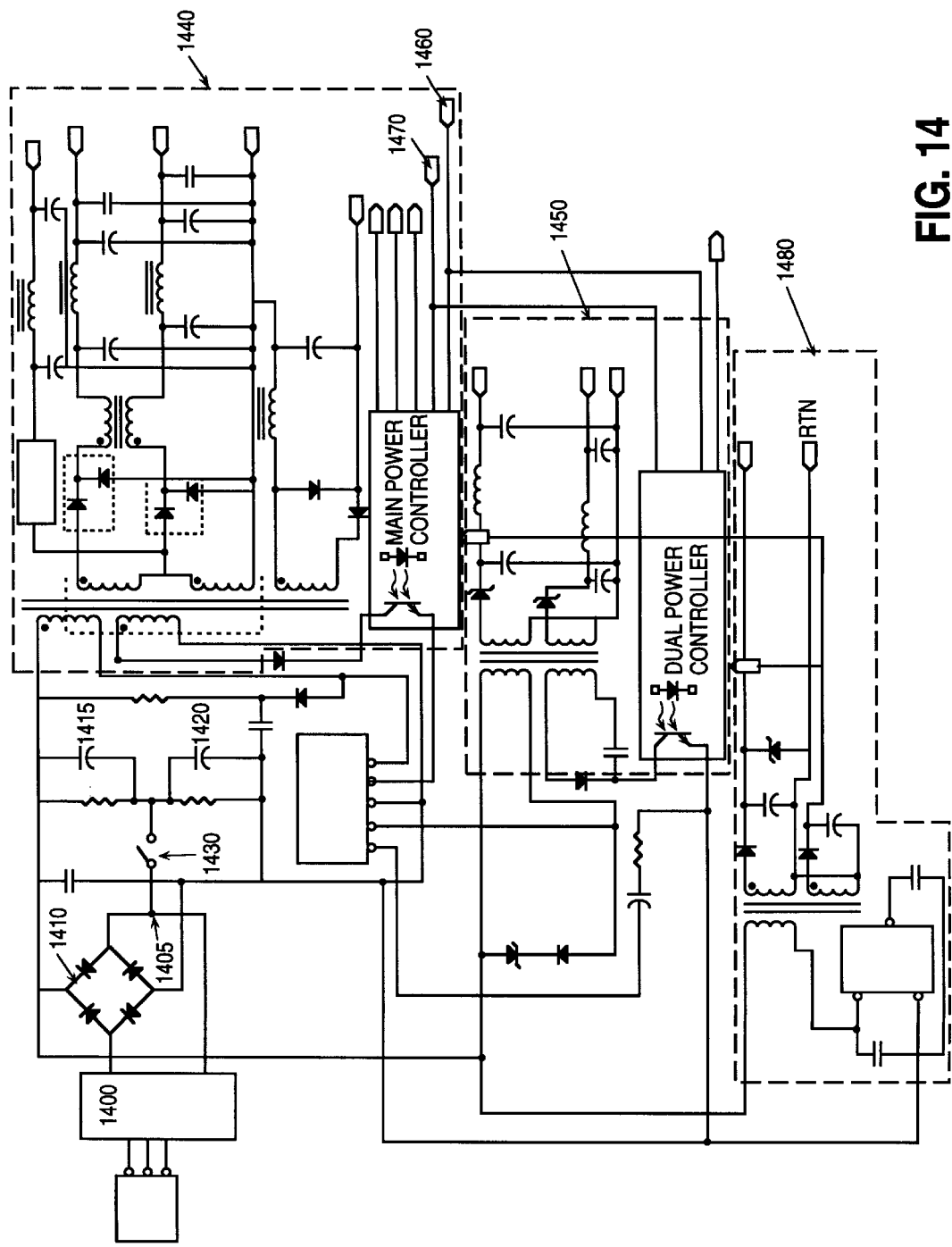
FIG. 14 is a presently preferred power supply that supplies multiple power levels to a computer according to the present invention.

Referring to FIG. 14, a presently preferred power supply for utilization by a computer comprises an electromagnetic interference filter 1400 and a rectifier 1410 that receives the AC mains input. The rectifier 1410 is coupled to capacitor 1415. The presently preferred main power supply 1440 is operated by a pulse width modulated switching block 230. The main power supply is presently preferred to output DC voltages having magnitudes of twelve (12), five (5), and three point three (3.3) volts.

A dual power supply 1450 is also operated by a pulse width modulated switching block 230. The output of dual power supply 1450 is presently preferred to be DC voltages having magnitudes of five (5) and three point three (3.3) volts. Main power supply 1440 is turned on by a PS ON signal 1460 from the computer. Dual power supply 1450 is turned on by a DUAL ON signal 1470 from the computer.

It is presently preferred that, a standby power supply 1480 provides a DC voltage having a magnitude of three point three (3.3) volt output when the computer is in standby mode.

While the embodiments, applications and advantages of the present invention have been depicted and described, there are many more embodiments, applications and advantages possible without deviating from the spirit of the inventive concepts described herein. The invention should only be restricted in accordance with the spirit of the claims appended hereto and is not restricted by the preferred embodiments, specification or drawings.

What is claimed is:

1. A power supply comprising:
   a first stage comprising a first stage input and a first stage output, said first stage input coupled to receive AC mains power and said first stage output providing a first power level;
   a second stage comprising a second stage input and a second stage output, said second stage input receiving said first power level and said second stage output providing a second power level;
   a third stage comprising a third stage input and a third stage output, said third stage input receiving said first power level and said third stage output providing a third power level; and
   a pulse width modulated switching block comprising a first modulation input, a second modulation input, said first modulation input coupled to receive a signal indicative of a voltage, current or power at said second stage output and said second modulation input coupled to receive a signal indicative of a voltage, current or power at said third stage output,
   wherein said pulse width modulated switching block varying operation of said second stage to vary said second power level according to said signal indicative of said a voltage, current or power at said second stage output and said pulse width modulated switching block varying operation of said third stage to vary said third power level according to said signal indicative of a voltage, current or power at said third stage output.

2. The power supply of claim 1 further comprising a standby stage comprising a standby input and a standby output, said standby input coupled to receive said first power level and said standby output providing a fourth power level.

3. The power supply of claim 1 further comprising a first feedback circuit comprising a first feedback input and a first feedback output, said first feedback input coupled to receive said voltage, current or power at said second stage output and said first feedback output providing said signal indicative of said voltage, current or power at said second stage output.

4. The power supply of claim 3 further comprising a second feedback circuit comprising a second feedback input and a second feedback output, said second feedback input coupled to receive said voltage, current or power at said third stage output and said second feedback output providing said a voltage, current or power at said third stage output.

5. The power supply of claim 4 wherein said first stage comprises
   a rectifier comprising a rectifier input and a rectifier output, said rectifier input receiving said AC mains power and said rectifier output providing a first rectified signal; and
   a power supply capacitor comprising a first power supply capacitor terminal and a second power supply capacitor terminal, said first and second power supply capacitor terminals coupled to said rectifier output, said capacitor providing said first power level.

6. The power supply of claim 5 wherein said power supply capacitor comprises a first capacitor comprising a first capacitor terminal and a second capacitor terminal, said first capacitor terminal coupled to said first power supply capacitor terminal and a second capacitor comprising third and fourth capacitor terminals, said third capacitor terminal coupled to said second capacitor terminal and said fourth capacitor terminal coupled to said second power supply capacitor terminal, said rectifier output comprising a first rectifier output terminal and a second rectifier output terminal, said power supply further comprising a power supply switch comprising a first power supply switch terminal and a second power supply switch terminal, said first power supply switch terminal coupled to said second rectifier output terminal and said second power supply switch terminal coupled to said second and third capacitor terminals.

7. The power supply of claim 1 wherein said second stage comprises a first winding coupled to said second stage input and a second winding coupled to said second stage output, said second winding magnetically coupled to said first winding, pulse width modulated switching block further comprising a first output coupled between said second stage input and said first winding.

8. The power supply of claim 6 wherein said third stage comprises a third winding coupled to said third stage input and a fourth winding coupled to said third stage output, said fourth winding magnetically coupled to said third winding, said pulse width modulated switching block further comprising a second output coupled between said second stage input and said third winding.

9. The power supply of claim 1 wherein said second power level and said third power level are provided to a computer, said computer utilizing said second power level in normal operation and said computer utilizing said third power level to power standby functions operating in a standby mode.

10. The power supply of claim 9 wherein said second power level has a first magnitude and said third power level has a second magnitude, wherein said first magnitude is greater than said second magnitude.

11. The power supply of claim 1 wherein said pulse width modulated switching block comprises a monolithic device.

12. The power supply of claim 11 wherein said monolithic device comprises five terminals.

13. The power supply of claim 1 wherein when said signal indicative of a power, voltage or current at said second stage output reaches a first threshold level said pulse width modulated switching block ceasing to operate said second stage and when said signal indicative of a power, voltage or current at said third stage output reaches a second threshold level said pulse width modulated switching block ceasing to operate said third stage.

14. A power supply comprising:
- a rectifier comprising a first rectifier input terminal, a second rectifier input terminal, a first rectifier output terminal and a second rectifier output terminal, said first rectifier input terminal and said second rectifier input terminal coupled to receive AC mains power;
- a power supply capacitor comprising a first power supply capacitor terminal and a second power supply capacitor terminal, said first and second power supply capacitor terminals coupled to said first rectifier output terminal and said second rectifier output terminal, said power supply capacitor providing a first power level;
- a first primary winding comprising a first primary winding terminal and a second primary winding terminal, said first and second primary winding terminals coupled to receive said first power level;
- a second primary winding comprising a third primary winding terminal and a fourth primary winding terminal, said third and fourth primary winding terminals coupled to receive said first power level;
- a first secondary winding comprising a a first secondary winding terminal and a second secondary winding terminal, said first secondary winding magnetically coupled to said first primary winding, said first and second secondary winding terminals providing a second power level;
- a second secondary winding comprising a comprising a third secondary winding terminal and a fourth secondary winding terminal, said second secondary winding magnetically coupled to said second primary winding, said third and fourth secondary winding terminals providing a third power level; and
- a pulse width modulated switching block comprising a first controller input, a second controller input, a first controller output and a second controller output, said first controller input coupled to receive a signal indicative of said second power level, said second controller input coupled to receive a signal indicative of said third power level, said first controller output coupled to said second primary winding terminal and said second controller output coupled to said fourth primary winding terminal.

15. The power supply of claim 14 wherein said pulse width modulated switching block further comprising a first switch comprising a first switch terminal, a second switch terminal, and a first switch control terminal, said first switch terminal and said second switch terminal coupled to said first controller output and said first switch control terminal operating said switch according to a signal received at said first controller input.

16. The power supply of claim 15 wherein said pulse width modulated switching block further comprising a second switch comprising a third switch terminal, a fourth switch terminal, and a second switch control terminal, said third switch terminal and said fourth switch terminal coupled to said second controller output and said second switch control terminal operating said switch according to a signal received at said second controller input.

17. The power supply of claim 16 wherein said first switch is switched on and off at a first duty cycle and said second switch is switched on and off at a second duty cycle.

18. The power supply of claim 14 further comprising a third primary winding comprising a fifth primary winding terminal and a sixth primary winding terminal, said fifth primary winding terminal and a sixth primary winding terminal coupled to receive said first power level and a third secondary winding further comprising a fifth secondary winding terminal and a sixth secondary winding terminal, said fifth secondary winding terminal and a sixth secondary winding terminal providing a fourth power level, said fourth power level comprising a magnitude less than a magnitude of said second power level or said third power level.

19. The power supply of claim 15 further comprising a first feedback circuit comprising a first feedback input and a first feedback output, said first feedback input coupled to receive said second power level and said first feedback output providing said signal indicative of said second power level.

20. The power supply of claim 16 further comprising a second feedback circuit comprising a second feedback input and a second feedback output, said second feedback input coupled to receive said third power level and said second feedback output providing said signal indicative of said third power level.

21. The power supply of claim 14 wherein said second power level and said third power level are provided to a computer, said computer utilizing said second power level in normal operation and said computer utilizing said third power level to power standby functions operating in a standby mode.

22. The power supply of claim 18 wherein said second power level has a first magnitude and said third power level has a second magnitude, wherein said first magnitude is greater than said second magnitude.

23. The power supply of claim 12 wherein said power supply capacitor comprises a first capacitor comprising a first capacitor terminal and a second capacitor terminal, said first capacitor terminal coupled to said first power supply capacitor terminal and a second capacitor comprising third and fourth capacitor terminals, said third capacitor terminal coupled to said second capacitor terminal and said fourth capacitor terminal coupled to said second power supply capacitor terminal, said rectifier output comprising a first rectifier output terminal and a second rectifier output terminal, said power supply further comprising a power supply switch comprising a first power supply switch terminal and a second power supply switch terminal, said first power supply switch terminal coupled to said second rectifier output terminal and said second power supply switch terminal coupled to said second capacitor terminal.

24. The power supply of claim 14 wherein said pulse width modulated switching block comprises a monolithic chip.

25. The power supply of claim 24 wherein said monolithic comprises five terminals.

* * * * *